(12) United States Patent
Kitamura et al.

(10) Patent No.: US 8,073,577 B2
(45) Date of Patent: Dec. 6, 2011

(54) ELECTRONIC CONTROL APPARATUS FOR CONTROLLING ON-VEHICLE DEVICES WHEN VEHICLE IS ABOUT TO BE SUBMERGED IN FLOODED AREA

(75) Inventors: Yuusuke Kitamura, Kariya (JP); Toru Itabashi, Anjo (JP); Michio Nakamura, Toyoake (JP); Naoto Sakai, Takahama (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 324 days.

(21) Appl. No.: 12/358,476

(22) Filed: Jan. 23, 2009

(65) Prior Publication Data

US 2009/0187314 A1 Jul. 23, 2009

(30) Foreign Application Priority Data

Jan. 23, 2008 (JP) ................................. 2008-012691

(51) Int. Cl.
*B60L 3/04* (2006.01)
(52) U.S. Cl. .............................. 701/1; 701/36; 307/10.1
(58) Field of Classification Search ................ 701/1, 36; 307/9.1, 10.1
See application file for complete search history.

(56) References Cited

U.S. PATENT DOCUMENTS

| | | | | |
|---|---|---|---|---|
| 5,547,208 A * | 8/1996 | Chappell et al. | ............... | 180/281 |
| 6,060,794 A * | 5/2000 | Takagi et al. | ................. | 307/125 |
| 6,111,373 A * | 8/2000 | Ohashi | .......................... | 318/265 |
| 6,201,363 B1 * | 3/2001 | Miyazawa | .................... | 318/283 |
| 6,278,250 B1 * | 8/2001 | Sasaki | ............................ | 318/283 |
| 6,337,550 B1 * | 1/2002 | Takahashi et al. | ............. | 318/483 |
| 6,396,227 B2 * | 5/2002 | Sasaki | ............................ | 318/283 |
| 6,459,168 B1 * | 10/2002 | Miyake et al. | ................ | 307/10.1 |
| 6,486,630 B2 * | 11/2002 | Takagi | ........................... | 318/445 |
| 6,489,739 B2 * | 12/2002 | Maldonado | .................... | 318/445 |
| 6,588,532 B1 * | 7/2003 | Adams et al. | .................. | 180/271 |
| 6,927,962 B2 * | 8/2005 | Tamura | ......................... | 361/104 |

FOREIGN PATENT DOCUMENTS

| | | |
|---|---|---|
| JP | 2000-154682 | 6/2000 |
| JP | 2001-287606 | 10/2001 |
| JP | 2002-013964 | 1/2002 |
| JP | 2002-227527 | 8/2002 |
| JP | 2006-317298 | 11/2006 |

OTHER PUBLICATIONS

Japanese Office Action dated Nov. 17, 2009, issued in corresponding Japanese Application No. 2008-012691, with English translation.

* cited by examiner

*Primary Examiner* — Paul N Dickson
*Assistant Examiner* — Nicole Verley
(74) *Attorney, Agent, or Firm* — Nixon & Vanderhye PC

(57) ABSTRACT

An electric control apparatus, mounted on a vehicle, has a height direction and comprises an electronic circuit board, a submersion sensor, and a controller. The electric circuit board has a mounting surface and is mounted in the vehicle so that the mounting surface is along the height direction of the vehicle. The submersion sensor, which is mounted on the mounting surface of the circuit board, senses a condition that the vehicle is about to be submerged in a flooded area and outputs an electric signal showing the condition. The controller, which is mounted on the mounting surface of the circuit board, performs control for securing safety of an occupant of the vehicle when the controller receives the electric signal from the submersion sensor. The submersion sensor is lower in a mounted position on the mounting surface of the circuit board than the controller along the height direction.

19 Claims, 6 Drawing Sheets

ELECTRONIC CONTROL APPARATUS FOR CONTROLLING ON-VEHICLE DEVICES WHEN VEHICLE IS ABOUT TO BE SUBMERGED IN FLOODED AREA

CROSS-REFERENCE TO RELATED APPLICATION

This application is based on and claims the benefit of priority from earlier Japanese Patent Application No. 2008-12691 filed Jan. 23, 2008, the description of which is incorporated herein by reference.

BACKGROUND OF THE INVENTION

1. Technical field of the Invention

The present invention relates to an electronic control apparatus for vehicles, and in particular, to the electronic control apparatus which is provided with a sensor to detect a submerged state of a vehicle and which has the capability of performing control to secure the safety of the occupants when the vehicle is about to be submerged.

2. Related Art

When a vehicle runs through a flooded road which is flooded due to river water, rain, or sea water, there is a risk that an electronic control apparatus to control the behaviors of the vehicle may malfunction. In order to avoid such a condition, a conventional electronic control apparatus has been known, which performs various kinds of control for securing the safety of the occupants when the vehicle is about to be submerged or partly submerged This kind of apparatus, which is installed within the vehicle, is provided with a sensor to detect a submerged state of a vehicle and a control IC that uses a signal detected by the sensor. This sensor, called a submersion sensor, has a pair of mutually opposed electrodes which are placed in parallel with a space therebetween.

In this kind of electronic control apparatus, when the vehicle is about to be submerged in a flooded region, the submersion sensor will detect a vehicle's submerged state by allowing leak current to flow between the mutually opposed electrodes (i.e., sensor electrodes) submerged in the water. When this submergence is detected, the control IC controls actions to prevent the vehicle, which actions include an action to cut off current from the battery to the starter for starting the engine so that the starter is prevented from malfunctioning due to the submergence.

Another known conventional electronic control unit with countermeasures for the submergence is provided with a single circuit board which is parallel to a plane horizontally installed within a vehicle (i.e., vehicle horizontal plane). A submersion sensor, a control IC and other necessary components are mounted on this vehicle horizontal plane.

Concerning this electronic control apparatus with such a circuit board, it is desired that the control IC be prevented from malfunctioning before the submersion sensor first detects the vehicle's submerged state. For this prevention, Japanese Patent Laid-open Publication No. 2006-317298 discloses a unit structure where an enclosure encloses necessary circuit components including the control IC so that the submersion sensor and the necessary circuitry other than the sensor electrodes are prevented from being wet.

However, in this electronic control apparatus with the circuit board in parallel with the vehicle horizontal plane, it is necessary that a plurality of submersion sensors must be installed on the circuit board to detect vehicle tilts and submergence in every way. This installation manner results in an increase in the number of parts for the apparatus, thereby increasing manufacturing costs of the apparatus.

In addition, in this electronic control apparatus, the necessary components including the submersion sensors and the control IC are mounted on the same circuit board. Hence, if it is desired in this apparatus that a blank space of the circuit board, which has no wiring, is reduced as much as possible to make the board area smaller but the sensor electrodes are kept to be exposed, it is necessary to give a complicated shape to the enclosure. This results in a problem that the structure of the apparatus becomes complex.

That is, the electric control apparatus exemplified by the foregoing publication often increases the number of parts and makes the apparatus structure complex, which may cause in an increase in manufacturing costs of the apparatus.

SUMMARY OF THE INVENTION

The present invention has been made in consideration of the above-stated situations, and it is an object of the present invention to provide an electronic control apparatus for vehicles, which still maintains simplicity of its configuration but is able to perform various kinds of control for securing the safety of the occupants when the vehicle runs through a flooded area as if being partly submerged.

In order to achieve the above object, the present invention provides, as one aspect thereof, an electric control apparatus mounted on a vehicle having a height direction, comprising an electric circuit board, a submersion sensor, and a controller. The electric circuit board has a mounting surface and is mounted in the vehicle so that the mounting surface is along the height direction of the vehicle. The submersion sensor is mounted on the mounting surface of the circuit board and senses a condition that the vehicle is about to be submerged in a flooded area and outputs an electric signal showing the condition. The controller is mounted on the mounting surface of the circuit board and performs control for securing safety of the occupants of the vehicle when the controller receives the electric signal from the submersion sensor, wherein the submersion sensor is positionally lower in a mounted position on the mounting surface of the circuit board than the controller along the height direction.

In the electronic control apparatus according to the present invention, the submersion sensor is positionally lower than the controller. Hence, when the vehicle runs a flooded area on the road or others and is about to be submerged in river water, rain water, sea water, or others, the submersion sensor is first submerged in the water before the controller is submerged in the water. It is therefore possible that the functions of the controller are maintained in such a submersion and the controller performs given safety securing control before the vehicle is heavily submerged in the water. In addition, thanks to the separation of the submersion sensor and the controller in the height direction of the vehicle, the electronic control apparatus can be simplified compared to the conventional.

It is preferred that the present electronic control apparatus further comprises a power supply that is mounted on the mounting surface of the circuit board so that the power supply is positionally higher than the controller in the height direction of the vehicle, converts a voltage of a power supply of the vehicle into an internal voltage available by components on the circuit board, and supplies the components with the internal voltage, the components including the detector and the controller.

In this configuration, supplying the power to the controller will not stop before the controller is submerged in the water. Hence, it is possible that the controller is able to surely and continuously perform the safety securing control until the controller is submerged in the water.

It is still preferred that the submersion sensor, the controller, and the power supply are aligned from a front of the vehicle in an order of the submersion sensor, the controller, and the power supply. In this case, from the front of the vehicle, the submersion sensor, the controller, and the power supply are aligned in this order along an oblique upward line on the circuit board. This oblique upward line may be approximately along a diagonal line of the circuit board.

In this electronic control apparatus, when the vehicle is tilted in the frontward before being submerged in the water, the submersion sensor, the controller, and the power supply are lined up in this order in an oblique direction to the water surface. Hence, even when the vehicle is tilted frontward and then submerged in the water, the safety securing control can still be maintained by the controller powered by the power supply.

DETAILED DESCRIPTION OF PREFERRED EMBODIMENTS

Hereinafter, referring to the accompanying drawings, an electric control apparatus for vehicles, which is according to an embodiment of the present invention, will now be described.

Figure 1:
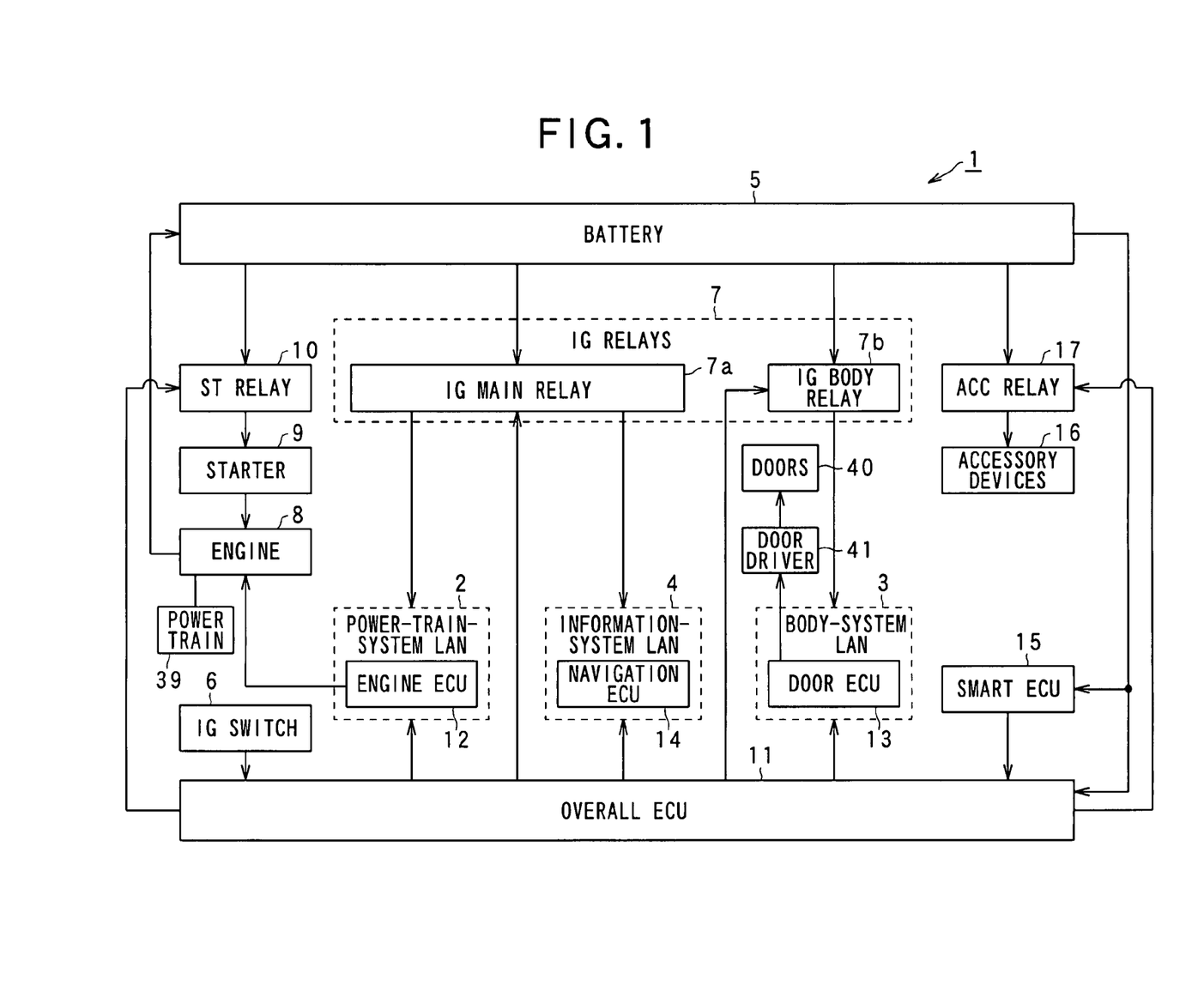
FIG. 1 is a block diagram showing the configuration of a control system for vehicles, which Is provided with an electric control apparatus (put into practice as an overall ECU (electronic control unit)) to which an embodiment of the present invention is applied.

FIG. 1 outlines in a block form a control system 1 for vehicles, which is provided with an electronic control apparatus to which an embodiment according to the present invention is applied. In this control system, the electronic control apparatus is reduced into practice as an overall ECU (electronic control unit).

As shown in FIG. 1, the control system 1 for vehicles is provided with a power-train-system on-vehicle LAN (local area network) 2 (hereinafter referred to as a power-train-system LAN) to which an electronic control apparatus for controlling the vehicle run is connected. This electronic control apparatus is realized as an ECU. The present control system 1 is also provided with a body-system on-vehicle LAN 3 (hereinafter referred to as a body-system LAN), an information-system on-vehicle LAN 4 (hereinafter referred to as an information-system LAN), an overall ECU 11, and a smart ECU 15. Of these, the body-system LAN is connected to an ECU which controls operations of the body of the vehicle. The information-system LAN is connected to an ECU which controls information-related items, such as audio, video, and communication matters of the vehicle. Further, the overall ECU 11 communicably connects the on-vehicle LANs 2-4 with each other and transmits control commands to the respective ECUs connected to the on-vehicle LANs 2-4. The smart ECU 15 sends commands to lock and unlock the vehicle doors in response to electromagnetic waves transmitted from a portable device carried by a user of the vehicle.

The ECUs connected to the on-vehicle LANs 2-4, the overall ECU 11, and the smart ECU 15 are constructed as computer units, respectively. Namely each of the computer units comprises a microcomputer including a CPU (central processing unit), ROM (read-only memory) and RAM (random-access memory). In addition to the microcomputer, each ECU comprises a power supply circuit powered by a battery 5 mounted on the vehicle, a communication circuit performs communication through the on-vehicle LANs 2-4, an I/O circuit which is in charge of inputting and outputting various signals necessary for realizing the functions assigned to each ECU, and other components.

The overall ECU 11 and the smart ECU 15 are powered without rest so as to operate continuously. For this, the power supply circuits of these ECUs 11 and 15 are directly connected to the battery 5, so that these ECUs 11 and 15 are operable independently of a state where a vehicle ignition switch (IG switch) 6 is switched to any position (i.e., a key cylinder position rotated by a vehicle master cylinder).

The respective ECUs connected to the on-vehicle LANs 2-4 have power supply circuits connected to the battery 5 via an ignition (IG) relay 7. If this IG relay 7 is in its on state, the power supply circuits are powered by the battery 5, whereby the ECUs are operable. The IG relay 7 is composed of an IG main relay 7a and an IG body relay 7b. The IG main relay 7a connects the battery 5 and the power supply circuits of the ECUs in the power-train-system and information-system LANs 2 and 4. Meanwhile the IG body relay 7b is placed to connect the battery 5 and the power supply circuit of the ECU in the body-system LAN 3.

The control system 1 includes a starter 9 and a starter (ST) relay 10 and the starter 9 is connected to the battery 5 via the ST relay 10. When the ST relay 10 is in its on state, the battery 5 powers the starter 9 so that an on-vehicle engine 8 can be activated. The drive power of the engine 8 is transmitted to not-shown wheels via a power train 39 including a transmission.

Accessory devices 16 such as an air conditioner and lighting devices are connected to the battery 5 via an accessory (ACC) relay 17 which is part of the control system 1. Thus when the ACC relay 17 is in its on state, the battery 5 is able to power the accessory devices 16 for operation thereof.

The various kinds of ECUs can be connected to each of the LANs 2-4. In the present embodiment, connected to the power-train-system LAN 2 is at least an engine ECU 12 for controlling the amount of fuel to be injected into the engine 8 and the ignition timing in the engine 8. Connected to the body-system LAN 3 is at least a door ECU 13 for controlling the lock/unlock actions of vehicle doors 40 using door driver 41 and the open/close actions of the window glass plates of the vehicle doors (i.e., moving up/down actions of the power windows). Also, to the information-system LAN 4, at least a navigation ECU 14 is connected, which controls route guidance to the vehicle and wireless communication with devices placed outside the vehicle.

Then engine ECU 12 includes a CPU. When this CPU receives a command to drive the engine 8 via the on-vehicle LAN 2, the CPU executes control to adjust the amount of fuel to be injected into the engine 8 and the timing of ignition of the fuel in the engine 8. The door ECU also includes a CPU, which is able to receive a command to control door lock/unlock actions via the on-vehicle LAN 3. Upon receiving this command, the CPU of the door ECU 13 drives door-lock motor(s) included in the door driver 41 so that the door(s) 30 can be locked or unlocked.

In addition, the navigation ECU 14 comprises a CPU and memories such as a ROM (e.g., EEPROM). Various kinds of information is stored in this ROM in advance. The information includes the contact information (for example, phone number) of a monitor center serving a predetermined destination and user's information to identify a user. The user's information is for example the identification number inherent to the vehicle, the serial number of an apparatus and/or a user's telephone number. When the CPU of the navigation ECU 14 receives a command to transmit wirelessly information about later-described vehicle's partial submersion via the on-vehicle LAN 4, the CPU performs, at least, control for wireless-transmitting to the monitor center, in addition to the user's information, information including positional information indicative of the vehicle's current position acquired using a GPS receiver (not shown).

Of course, control for actions other than those stated above may be assigned to the CPUs of the ECUs 12-14.

The smart ECU 15 comprises a CPU, which receives an authentication code to be transmitted with electromeric waves via an on-vehicle antenna (not shown). The CPU uses the received authentication code to confirm that the source that has transmitted the authentication code (that is, the portable device carried by the vehicle's user) is legitimately registered in advance. Upon having authenticated that fact, the CPU of the smart ECU 15 provides the overall ECU 11 with an authentication signal indicative of the completion of the confirmation.

Figure 2:
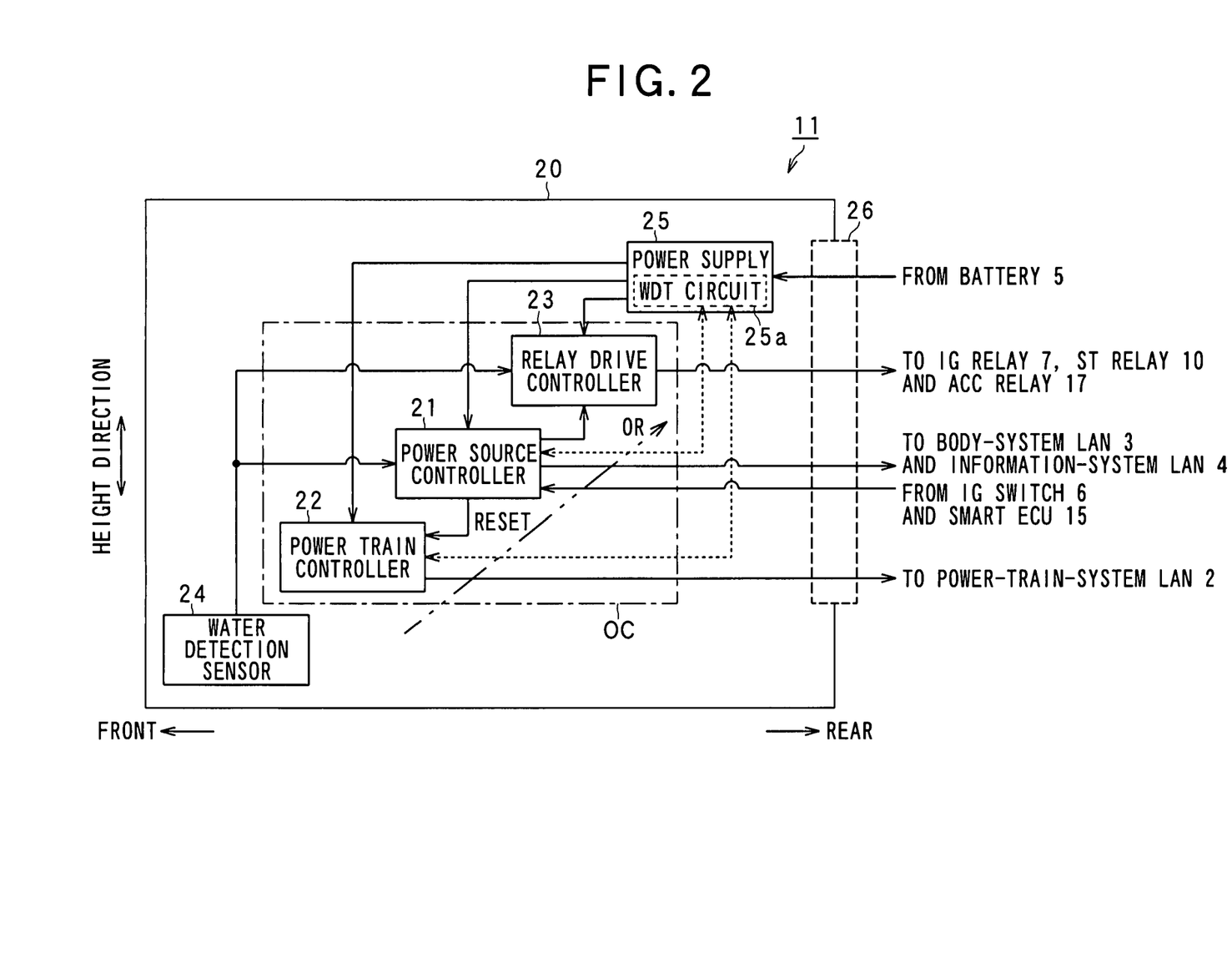
FIG. 2 is a block diagram showing the configuration of the overall ECU.

FIG. 2 shows the configuration of the overall ECU 11. As shown, the overall ECU 11 is provided with a power source controller 21 which engages in overall control of the power supply from the battery 5 to the other on-vehicle devices and units, in addition to a power train controller 22, a water detection sensor 24, a relay drive controller 23, a power supply 25, and a connector 26. When the power train controller 22 receives an activation signal from the power source controller 21, this controller 22 will perform overall control of the respective ECUs (including the engine ECU 12) connected to the power-train-system LAN 2. The water detection sensor 24 is configured to detect that the vehicle is partly submerged in a flooded area, and outputs a signal indicative of the submersion when having detected such a partly submerged state. The relay drive controller 23 is configured to drive the various relays 7, 10 and 17 in response to inputs from the power source controller 21 or the water detection sensor 24. The power supply 25 is configured to convert the input voltage from the battery 5 into an internal voltage to be supplied to the respective components 21-24. The connector 26 is in charger of inputting and outputting various signals necessary for enabling the respective components to perform the functions assigned thereto.

Of the above components, the power train controller 22, the power source controller 21, and the relay drive controller 23 compose an overall controller OC, as shown in FIG. 2.

Moreover, the respective circuitry components 21-26 are mounted on a rectangular circuit board 20 consisting of a plurality of layers. As pictorially shown in FIG. 3, this circuit board 20 is installed within the vehicle such that the component mounting surface (i.e., one surface) of the circuit board 20 is along the height direction of the vehicle. The installed position is, for example, under the dashboard of the vehicle VE. With the circuit board 20 installed within the vehicle VE like the above, the respective components 21-25, mounted on the circuit board 20, are aligned along an oblique rising line OR starting from the front and lower side of the vehicle VE. Practically, the components 21-25 are aligned in the order of starting from the water detection sensor 24, via the power train controller 22, the power source controller 21, and the relay drive controller 23, to the power supply 25. That is, these components 21-25 are mounted on the circuit board 20 approximately along a diagonal line (similar to the oblique rising line OR) of the circuit board 20. The connector 26 is mounted on an edge of the circuit board 20, wherein the edge is along the height direction of the vehicle VE. The connector 26 is mounted so as to positionally correspond to the components 21-23 and 25 mounted on the circuit board 20.

Figure 4:
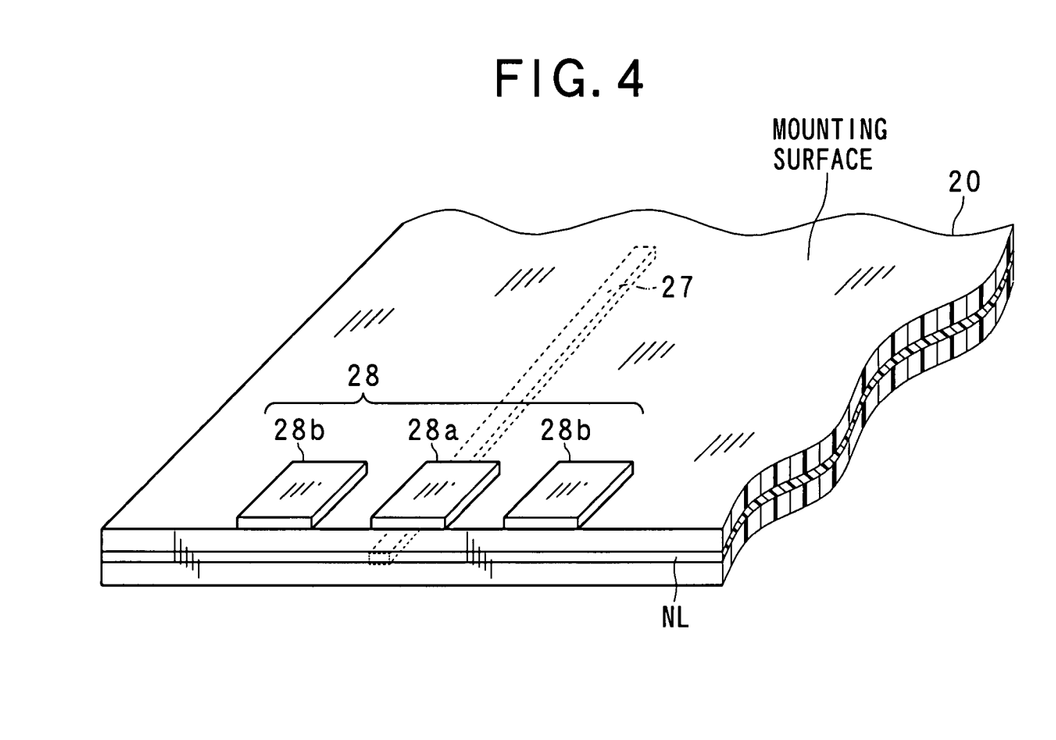
FIG. 4 is a illustration showing the structure of a submersion sensor sensing a partial submerged state of a vehicle.

The water detection sensor 24 is shown in FIG. 4. As shown, the water detection sensor 24 is provided with three sensor electrodes 28 consisting of a single first sensor electrode 28a and two second sensor electrodes 28b. The first sensor electrode 28a is electrically connected to a conductive wire 27 for detecting a vehicle submersion. When detecting a vehicle submersion, the conductive wire 27 outputs a signal indicating the vehicle submersion. This signal is supplied to the power source controller 21 and the relay drive controller 23 on the circuit board 20. The second sensor electrodes 28b are grounded. These sensor electrodes 28 are mounted in a mutually non-contacted and mutually parallel form with the first sensor electrode 28a located between the two second sensor electrodes 28b. In order to prevent, as much as possible, the conductive wire 27 from being immersed in water, this conductive wire 27 is mounted on an inner layer NL within the circuit board 20.

In this water detection sensor 24, when the spaces between the first and second sensor electrodes 28a and 28b become electrically conductive due to getting wet with or being immersed in water, leak current flows between the first and second sensor electrodes 28a and 28b, the signal indicating the detection of the submersion (i.e., the Submersion-detected signal) is supplied to both the power source controller 21 and the relay drive controller 23.

Specifically, the voltage on the submersion detecting conducive wire 27 is pulled up via a not-shown resistor so that the pulled-up voltage level is outputted as the submersion signal. More specifically, when the leak current flows between the electrodes, the voltage level on the conductive wire 27 is forced to be dropped. This drop in the voltage level is then subjected to monitoring as to whether or not the dropped voltage level is below a predetermined threshold, so that this monitored results can be used to detect whether or not the vehicle VE is about to submerge in a flooded area, for example.

Returning to FIG. 2, a watchdog timer circuit 25a (hereinafter referred to as a WDT circuit) incorporated in the power supply 25 will now be described. This watchdog timer circuit 25a is to prevent malfunctions which may occur in the power source controller 21 and the power train controller 22.

The WDT circuit 25a has circuitry to receive operational pulse signals (called watchdog pulses) respectively outputted, at intervals within a given period of time, from the power source controller 21 and the power train controller 22 which respectively perform given programs assigned thereto. In cases where the operational pulse signals are not given within a prescribed period of time which is decided to be longer than the given period of time, a reset signal is outputted to the power source controller 21 and/or the power train controller 22 which have not supplied the operational pulse signal(s) to the WDT circuit 25a. When being given, the reset signal allows those circuits 21 and/or 22 to be initialized.

The power train controller 22 calculates the amount of power necessary for driving the engine 8 on the basis of the position of a vehicle's shift lever and the amount of depressing a vehicle's accelerator. Using the calculated amount of power, the power train controller 22 transmits to the engine ECU 12, via the on-vehicle LAN 2, a command to instruct the engine 8 to be driven. This command transmission is carried out as travel control based a hybrid control manner.

When receiving from the IC switch 6 a state signal indicating ACC=ON (i.e., when the vehicle master key is turned to the ACC position), the power source controller 21 controls the relay drive controller 23 so as to turn on the ACC relay 17, whereby the accessory devices 16 become operable. Moreover, when receiving from the IG switch 6 a state signal indicating IG=ON (i.e., when the vehicle master key is turned to the ON position), the power source controller 21 controls the relay drive controller 23 so as to turn on the IG relay 7 (i.e., the IG main relay 7a and the IG body relay 7b). Hence, the respective ECUs connected to the on-vehicle LANs 2-4 are operable. Furthermore, when receiving from the IG switch 6 a state signal indicating START=ON (i.e., when the vehicle master key is turned to the START position), the power source controller 21 controls the relay drive controller 23 so as to turn on the ST relay 10, so that the starter 9 is activated.

The power source controller 21 operates when the IG switch 6 keeps its LOCK position and receives an authentic signal from the smart ECU 15. The power source controller 21 responds to this condition by turning on the IG body relay 7b through the relay drive controller 23. This response of the power source controller 21 makes it possible that the respective ECUs connected to the on-vehicle LAN 3 are operable and a command instructing the vehicle door(s) 30 to be locked or unlocked is transmitted to the door ECU 13 via the on-vehicle LAN 3.

Figure 5:
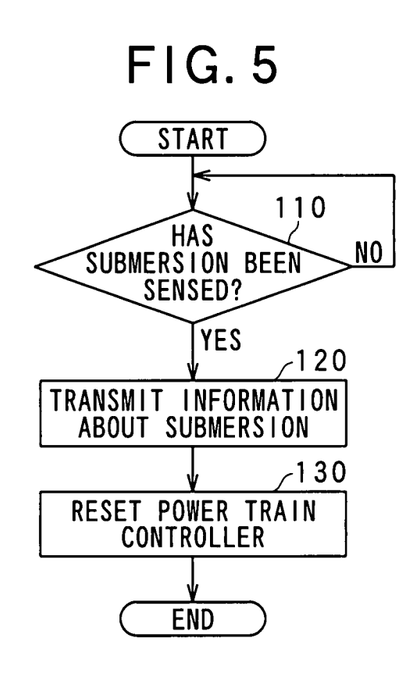
FIG. 5 is a flowchart detailing a submersion control process executed by a power supply controller provided in the overall ECU.

In addition to the above, the power source controller 21 is able to operate as shown in FIG. 5. Practically, when the submersion-detected signal is given from the submersion sensor (YES at step S110), the power source controller 21 transmits, to the navigation ECU 14, via the on-vehicle LAN 4, a command Instructing wireless transmission of information indicating that the vehicle is about to be submersed in water (submersion information) (step s120). After this, the power source controller 21 outputs a reset signal to the power train controller 22 to initialize this controller 22 (step S130).

Incidentally, this power source controller 21 is produced by using hardware circuits, such as logic circuits, which are given the functions necessary for realizing the above control.

In response to receiving from the power source controller 21 the command for the wireless transmission of Information indicating that the vehicle is about to be submersed in water, the CPU of the navigation ECU 14 radio-transmits toward the monitor center information about the submersion, including the user's information and the positional information. When the power train controller 22 is initialized, the engine ECU 12 stops controlling the adjustment of both the amount of fuel to be injected Into the engine 8 and the timing of ignition of the fuel in the engine 8.

Figure 6:
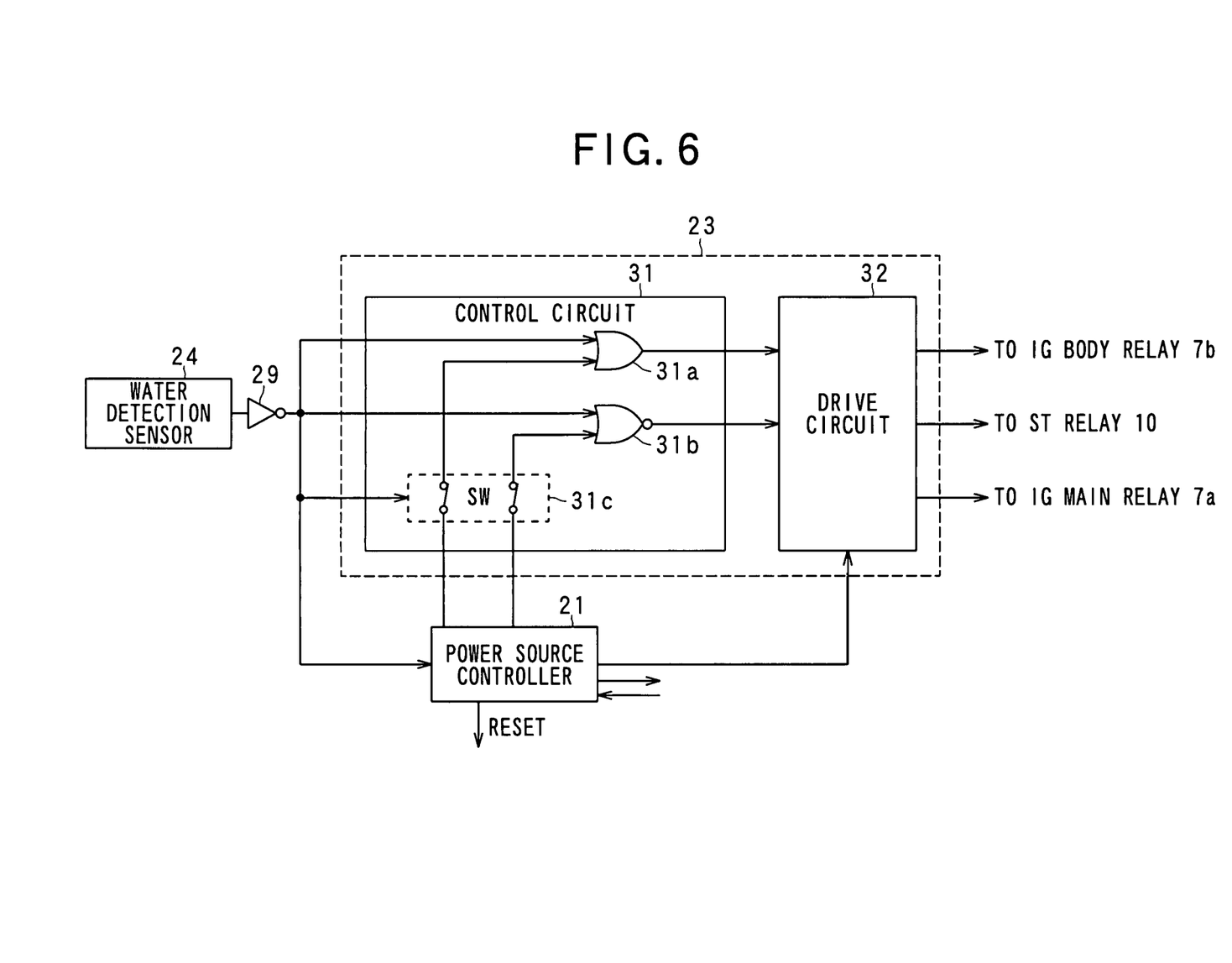
FIG. 6 is a block diagram showing the configuration of a relay drive controller provided in the overall ECU.

FIG. 6 shows the configuration of the relay drive controller 23. As shown in FIG. 6, the relay drive controller 23 is provided with a control circuit 31 and a drive circuit 32. The control circuit 31 responds to an input signal from the power source controller 21 or a water detection sensor 24 by outputting a switch signal for tuning on/off the IG body relay 7b and the ST relay 10. In response to the switch signal from the control circuit 31, the drive circuit 32 drives the IG body relay 7b and the ST relay 10 so that those relays can be turned on/off selectively. This drive circuit 32 also receives an input from the power source controller 21. Depending on the input, the drive circuit 32 drives the IG main relay 7a into its on/off state.

Practically, the control circuit 31 is connected to the submersion sensor via a NOT circuit 29. Hence, when the water detection sensor 24 outputs the submersion-detected signal (that is, the voltage signal on the conductive wire 27 for detecting the submersion drops in its level), the input voltage to the control circuit 31 is changed to its H (logical high) level.

Further, the control circuit 31 is able to receive a body ON signal (logical H (high) level) from the power source controller 21, the submersion-detected signal (normal H level) from the submersion sensor and a starter OFF signal (logical H level) from the power source controller 21. The control circuit 31 comprises an OR circuit 31a and a NOR circuit 31b. When the body ON signal or the submersion-detected signal is given, the OR circuit 31a outputs to the drive circuit 32 a body-state ON signal (logical H level) to bring the IG body relay 7b into its on state. Meanwhile, when the starter OFF signal or the submersion-detected signal is given, the NOR circuit 31b outputs to the drive circuit 32 a starter-state OFF signal (logical L level) to bring the ST relay 10 into its off state.

In the OR circuit 31a, the input of the body OFF signal (logical L level) from the power source controller 21 allows the OR circuit 31a to output the body-state OFF signal (logical L level) to bring the IG body relay 7b into its off state. In contrast, in the NOR circuit 31b, the input of the starter ON signal (logical L level) form the power source controller 21 allows the NOR circuit 31b to output the starter-state ON signal (logical H level) to bring the ST relay 10 into its on state.

In this way, the control circuit 31 outputs the body-state ON signal (logical H level) and the starter-state OFF signal (logical L level) whenever the submersion-detected signal (logical H level) is inputted from the water detection sensor 24, even if the body OFF signal (logical L level) is inputted from the power source controller 21.

Both of the OR and NOR circuits 31a and 31b are connected to the power source controller 21 via an electronic on/off switch 31c, which transmits the body OFF signal from the power source controller 21 to both the circuits 31a and 31b in an on/off selective manner. The switch 31c is turned off in response to the input of the submersion-detected signal (logical H level) from the water detection sensor 24. Turning off the switch 31c will cut off the input from the power source controller 21 to the circuits 31a and 31b, so that the accuracy of control performed by the control circuit 31 can be secured when the vehicle VE is about to be submerged.

Figure 3:
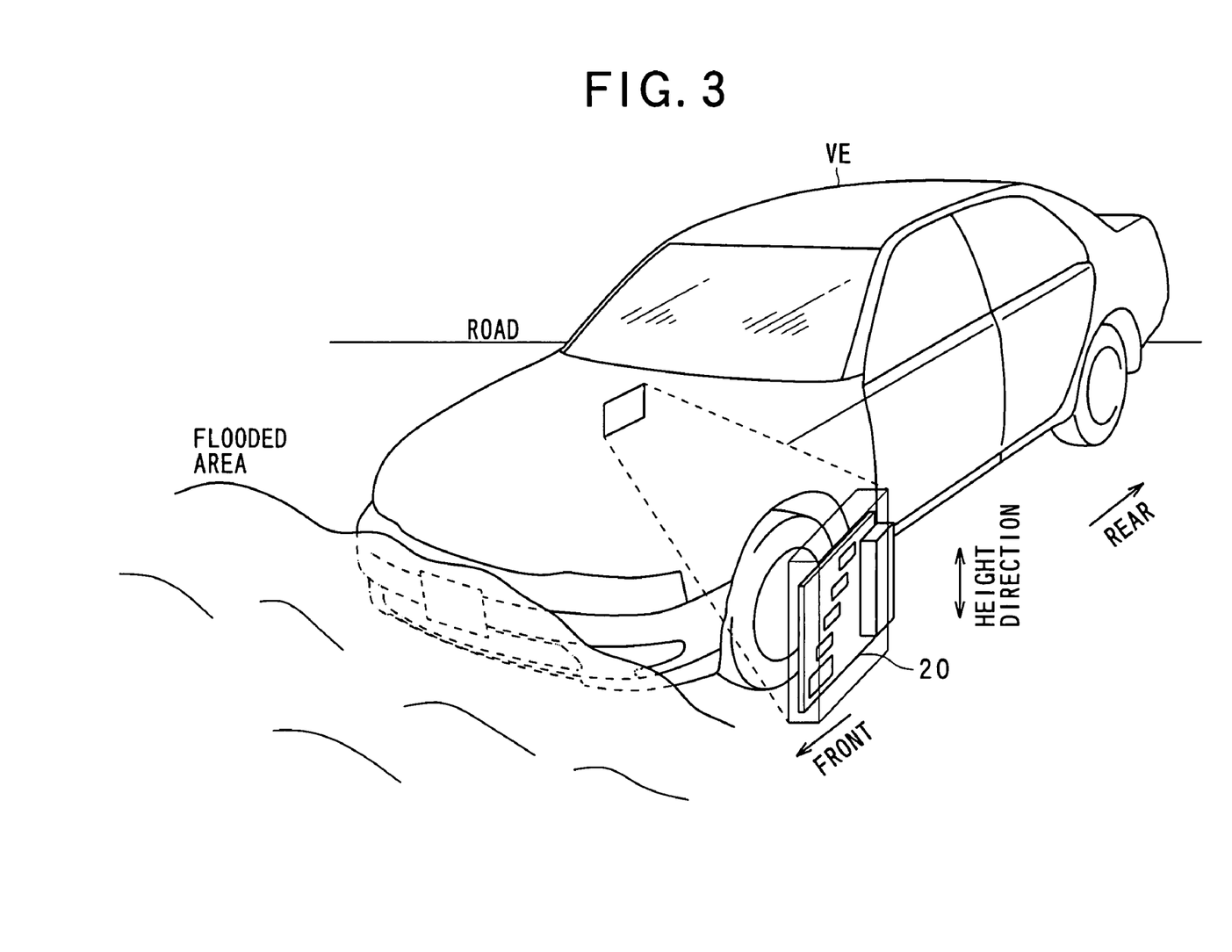
FIG. 3 pictorially explains how the circuit board of the overall ECU is installed within a vehicle.

In the control system 1 according to the present embodiment, the overall ECU 11 has both the relay drive controller 23 and the water detection sensor 24 mounted on the same circuit board 20. In addition, with the circuit board 20 mounted in the vehicle VE such that the board surface is along the height direction of the vehicle VE, the water detection sensor 24 is located lower than the relay drive controller 23. When the relay drive controller 23 receives a submersion-detected signal from the water detection sensor 24, the door ECU 13 becomes operable, whilst the starter 9 cannot be operated because of being locked. This operable and lock control is performed in a fixed manner, once such a control has been effected.

Hence, when the vehicle is about to be submerged, the overall ECU 11 keeps a door/windowpane controllable state, where the occupants can control, at a desired timing, the up/down actions of the windowpanes of the vehicle doors 40 (i.e., opening/closing the windowpanes) and the lock/unlock actions of the doors.

Accordingly, even with the system still kept simpler in its construction, the overall ECU 11 provides reliable vehicle control to secure the safety of the occupants when the vehicle is about to be submerged at least partly in a flooded area, for instance.

In addition, the overall ECU 11 is always powered via the power supply circuit 25 directly connected to the battery 5, so that the overall ECU 11 can keep its active state without rest. Hence, the IG switch 6 and the IG relay 7 are in their off states, the reliable control for securing the safety can be performed.

In the present overall ECU 11, the connector 26 is arranged on a height-directional edge of the circuit board 20 so as to be face-to-face with the components 21-23 on the circuit board 20. Hence, of the control for securing the safety, higher-priority control can still be secured, further increasing reliability for the safety control.

In the foregoing embodiment, as comparison with the components according to the present invention, the overall ECU 11 corresponds to the electronic control apparatus, the water detection sensor 24 is provided as a submersion sensor, the overall controller OC consisting of the controllers 21-23 is provided as a controller, the circuit board 20 is provided as an electric circuit board, the power relay 25 is provided as a power supply, the relays 7, 10 and 17 are provided as switching members, the power source controller 21 is provided as a power controller, the control circuit 31 is provided as a switching-member controller, the door driver 41, starter 9, and others are provided as on-vehicle electric devices, the power train controller 24 is provided as a power train controller, and the steps S110 and S120 carried out by the power source controller 21 compose communication control means.

MODIFICATIONS

Modifications according to the electric control apparatus of the present invention will now be described.

A first modification relates to the construction of the water detection sensor 24. In the foregoing embodiment, the water detection sensor 24 comprises the sensor electrodes 28 consisting of the first sensor electrode 28a and the two second sensor electrodes 28b. This construction is simply an example, but may be modified into other forms which can detect, at least, a vehicle's partially submerged state and output an electric submersion-detected signal showing such a submerged state.

A second modification relates to the number of sensor electrodes. The foregoing embodiment has been explained such that the sensor electrodes 28 are three in number. It is sufficient that the first sensor electrode 28a may be, at least, one in number and the second sensor electrode 28b may also be, at least, one in number. As a further modified form, a slit may be provided between the first sensor electrode 28a and each of the second sensor electrodes 28b, with the result that wet which is as much as dew condensation cannot provide the conduction between the first end second sensor electrodes 28a and 28b. This slit is just one example, and other means for shutting off may be provided.

Figure 7A:
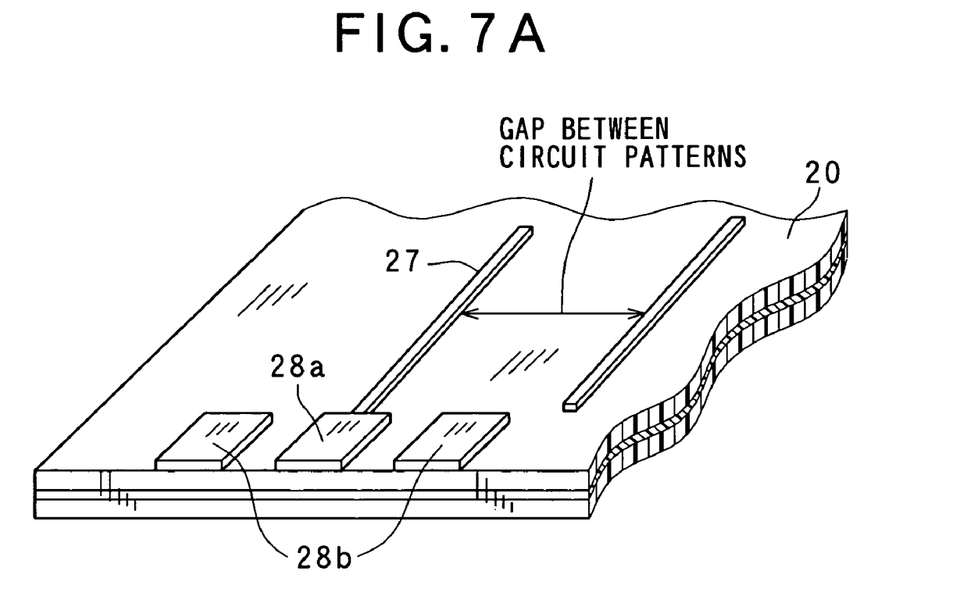
FIGS. 7A and 7B pictorially explain how a submersion detecting conductor is placed on a circuit board in the apparatus.
Figure 7B:
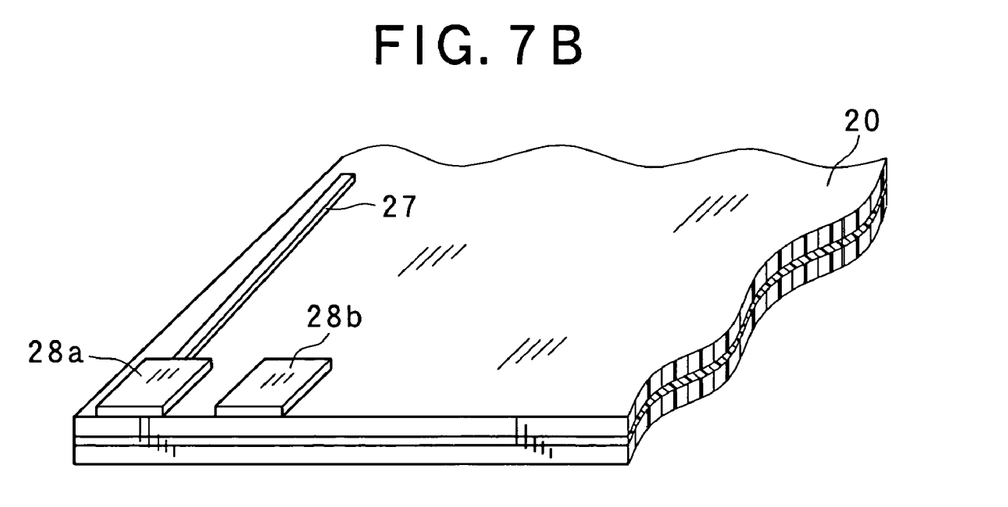

A third modification concerns the conductive wire 27. It is not always true that this conductive wire 27 is arranged on an inner layer of the circuit board 20. It is sufficient to prevent the circuit board 20 from being wet as much as possible. In view of this object, the conductive wire 27 may be arranged on the surface itself of the circuit board 20 as long as a pattern gap to prevent a short-circuit with other conductive wires is secured, as shown in FIG. 7A. If adopting this structure shown in FIG. 7A, it Is preferable that the conductive wire 27 is arranged on an end of the circuit board 20, as shown in FIG. 7B.

A forth modification exemplifies another arrangement way of the power source controller 21 and the power train controller 22 which are provided in the overall ECU 11 in the foregoing embodiment and are mounted on the circuit board 20. This is just an example, and the on-vehicle LANs may be modified to enable those components 21 and 22 to be provided in other ECUs. Alternatively, the power source controller 21 may be configured to perform the travel control performed by the power train controller 22 as well as the power supply control assigned thereto.

A fifth modification is concerned with share of the control (i.e., the safety securing control) performed by the overall ECU 11 when the water detection sensor 24 outputs the submersion-detected signal. That is, in the foregoing embodiment, the relay drive controller 23 controls actions with which, for example, the door ECU 13 is brought into its operable state and locked at its operable state, while the power source controller 21 controls actions with which, for example, the navigation ECU 14 is commanded to radio-transmit information about the submersion. This is also one example, may not be limited to this control share manner. By way of example, all the control actions for securing the safety, which are shared by both controllers 23 and 21, can be assigned to either one of the controllers 23 and 21. In such a case, it is possible to reduce the number of controllers in the overall ECU 11.

Another modification can be directed to how to construct the Controllers. In the foregoing embodiment, the safety securing control is carried out by the controllers constructed using the electric circuits including logic circuits. However, instead of this, at least one of the relay drive controller 23 and the power source controller 21 may be constructed using a computer system so that the controller can operate on algorithms given by software programs.

Another modification can be given to the safety securing control executed by the power source controller 21. In the foregoing embodiment, the control includes the transmission of the command to instruct the navigation EVU 14 to radio-transition of the submersion information. Instead, the control may include the transmission of a command to instruct the door ECU 13 to unlock the vehicles door(s) or may include the transmitting of a command to instruct the other ECUs connected to the body-system LAN 3 to open a vehicle sliding roof.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An electrical control apparatus mounted on a vehicle having a height direction, said apparatus comprising:
    an electric circuit board that has a mounting surface and that is mounted in the vehicle so that the mounting surface is along the height direction of the vehicle;
    a submersion sensor that is mounted on the mounting surface of the circuit board and senses a condition that the vehicle is about to be submerged in a flooded area and outputs an electric signal showing the condition;

a controller that is mounted on the mounting surface of the circuit board and performs control for securing safety of an occupant of the vehicle when the controller receives the electric signal from the submersion sensor, wherein the submersion sensor is lower in a mounted position on the mounting surface of the circuit board than the controller along the height direction; and a power supply that is mounted on the mounting surface of the circuit board such that the power supply is positionally higher than the controller in the height direction of the vehicle, converts a voltage of a power supply of the vehicle into an internal voltage available to components on the circuit board, and supplies the components with the internal voltage, the components including the detector and the controller, wherein the submersion sensor, the controller, and the power supply are aligned from a front of the vehicle in an order advancing from the submersion sensor to the power supply via the controller.

2. The apparatus of claim 1, wherein the circuit board is structured as a multiple layered circuit board on an inner layer of which there are provided a conductive wire connecting the submersion sensor and controller.

3. The apparatus of claim 1, wherein the vehicle comprises a switching member placed on a path connecting the power supply of the vehicle and an on-vehicle electric device and the controller comprises a power controller that is mounted on the mounting surface of the circuit board and switches the switching members between an on-state where the on-vehicle electric device is powered and an off-state where the on-vehicle electric device is shut off from being powered, in response to a command issued from an occupant of the vehicle, and a switching-member controller that is mounted on the mounting surface of the circuit board and controls the switching member so as to lock the switching member at either the on-state or the off-state regardless of how the power controller controls the switching member when the submersion sensor outputs the electric signal, wherein the power controller is positionally lower than the switching-member controller in the height direction of the vehicle.

4. The apparatus of claim 3, wherein the vehicle is provided with a door having a windowpane, the on-vehicle electric device is a device for opening and closing the windowpane of the door of the vehicle, and the switching-member controller is provided to lock the switching member at the on-state of the device for opening and closing the windowpane.

5. The apparatus of claim 3, wherein the vehicle is provided with an engine, the on-vehicle electric device is a device for starting the engine of the vehicle, and the switching-member controller is provided to lock the switching member at the off-state of the device for starting the engine.

6. The apparatus of claim 1, wherein the power supply of the electric control apparatus comprises monitoring means for monitoring whether or not the controller is functioning normally and performing a monitoring process to initialize the controller when the controller is out of order.

7. The apparatus of claim 1, wherein the submersion sensor, the controller, and the power supply are mounted on the mounting surface of the circuit board along an oblique upward line imaginarily set to the circuit board in the order of advancing from the submersion sensor to the power supply via the controller when viewing from a front of the vehicle to a rear thereof.

8. The apparatus of claim 7, wherein the circuit board is square in shape and the oblique upward line is a diagonal line of the circuit board.

9. An electrical control apparatus mounted on a vehicle having a height direction, said apparatus comprising:

an electric circuit board that has a mounting surface and that is mounted in the vehicle so that the mounting surface is along the height direction of the vehicle;

a submersion sensor that is mounted on the mounting surface of the circuit board and senses a condition that the vehicle is about to be submerged in a flooded area and outputs an electric signal showing the condition;

a controller that is mounted on the mounting surface of the circuit board and performs control for securing safety of an occupant of the vehicle when the controller receives the electric signal from the submersion sensor, wherein the submersion sensor is lower in a mounted position on the mounting surface of the circuit board than the controller along the height direction; and a power supply that is mounted on the mounting surface of the circuit board so that the power supply is positionally higher than the controller in the height direction of the vehicle, converts a voltage of a power supply of the vehicle into an internal voltage available to components on the circuit board, and supplies the components with the internal voltage, the components including the detector and the controller, wherein:

the vehicle comprises a switching member placed on a path connecting the power supply of the vehicle and an on-vehicle electric device and the controller comprises a power controller that is mounted on the mounting surface of the circuit board and switches the switching members between an on-state where the on-vehicle electric device is powered and an off-state where the on-vehicle electric device is shut off from being powered, in response to a command issued from an occupant of the vehicle, and a switching-member controller that is mounted on the mounting surface of the circuit board and controls the switching member so as to lock the switching member at either the on-state or the off-state regardless of how the power controller controls the switching member when the submersion sensor outputs the electric signal, wherein the power controller is positionally lowered than the switching-member controller in the height direction of the vehicle.

10. The apparatus of claim 9, wherein the vehicle is provided with a door having a windowpane, the on-vehicle electric device is a device for opening and closing the windowpane of the door of the vehicle, and the switching-member controller is provided to lock the switching member at the on-state of the device for opening and closing the windowpane.

11. The apparatus of claim 9, wherein the vehicle is provided with an engine, the on-vehicle electric device is a device for starting the engine of the vehicle, and the switching-member controller is provided to lock the switching member at the off-state of the device for starting the engine.

12. The apparatus of claim 9, wherein the controller is communicably connected to each of other electronic control apparatuses mounted on the vehicle via communication lines.

13. The apparatus of claim 12, wherein the vehicle is provided with a power train for controlling travel of the vehicle and the controller comprises a power train controller to operate the power train for controlling the travel in response to a travel command given to the power train controller.

14. The apparatus of claim 13, wherein the controller further comprises communication control means for performing a communication process to transmit a command to a given electronic control apparatus among the other electronic control apparatuses, the given electronic control apparatus being in charge of radio-communicating with an external member outside the vehicle, the command being to radio-transmit, to a given destination, information indicative of a fact the vehicle is about to be submerged.

15. The apparatus of claim 14, wherein
the communication control means is placed in the power controller which is positionally higher than the power train controller in the height direction of the vehicle.

16. The apparatus of claim 15, wherein the power controller is provided to perform initialization of the power train controller as the control for securing safety of the occupant of the vehicle.

17. The apparatus of claim 9, wherein the power controller and the switching-member controller are mounted on the mounting surface of the circuit board along an oblique upward line imaginarily set to the circuit board in an order advancing from the power controller to the switching-member controller when viewing from a front of the vehicle to a rear thereof.

18. The apparatus of claim 9, wherein the power supply of the electric control apparatus comprises monitoring means for monitoring whether or not the controller is functioning normally and performing a monitoring process to initialize the controller when the controller is out of order.

19. The apparatus of claim 18, wherein the controller is provided with, as part of the components, a plurality of controllers and
the monitoring means is provided to perform the monitoring process with each of the plurality of controllers.

* * * * *